United States Patent
Wei et al.

(10) Patent No.: US 11,272,561 B2
(45) Date of Patent: Mar. 8, 2022

(54) METHODS AND APPARATUSES FOR BEAM FAILURE RECOVERY

(71) Applicant: FG Innovation Company Limited, Tuen Mun (HK)

(72) Inventors: Chia-Hung Wei, Hsinchu (TW); Chia-Hao Yu, Yilan (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 97 days.

(21) Appl. No.: 16/791,794

(22) Filed: Feb. 14, 2020

(65) Prior Publication Data
US 2020/0267797 A1 Aug. 20, 2020

Related U.S. Application Data

(60) Provisional application No. 62/806,087, filed on Feb. 15, 2019, provisional application No. 62/825,321, filed on Mar. 28, 2019.

(51) Int. Cl.
*H04W 76/19* (2018.01)
*H04W 72/04* (2009.01)

(52) U.S. Cl.
CPC ......... *H04W 76/19* (2018.02); *H04W 72/042* (2013.01); *H04W 72/0413* (2013.01)

(58) Field of Classification Search
CPC .. H04B 7/0617; H04B 7/0695; H04B 7/0626; H04B 7/063; H04B 7/0632; H04B 7/088; H04L 1/18; H04L 1/1861; H04L 5/0055; H04W 16/28; H04W 72/042; H04W 72/046; H04W 76/19; H04W 88/02; H04W 88/08
See application file for complete search history.

(56) References Cited

U.S. PATENT DOCUMENTS

| | | | | |
|---|---|---|---|---|
| 10,992,366 B2* | 4/2021 | Jung | ................... | H04B 7/0695 |
| 11,140,567 B2* | 10/2021 | Tsai | ..................... | H04W 24/10 |
| 2019/0207667 A1* | 7/2019 | Zhou | .................... | H04L 1/0057 |
| 2019/0215820 A1* | 7/2019 | Cirik | ................. | H04W 72/0446 |

(Continued)

FOREIGN PATENT DOCUMENTS

CN 109121223 A 1/2019

OTHER PUBLICATIONS

Intel Corporation, Summary on SCell BFR and Beam Measurement 3GPP TSG RAN WGl Meeting #95, Spokane, USA, Nov. 12-16, 2018, R1-1813978, Nov. 30, 2018(Nov. 30, 2018), the whole document.

(Continued)

*Primary Examiner* — Brian T O Connor
(74) *Attorney, Agent, or Firm* — ScienBiziP, P.C.

(57) ABSTRACT

A method performed by a User Equipment (UE) is provided. The method includes performing at least one Beam Failure Recovery (BFR) procedure. The at least one BFR procedure includes transmitting a Medium Access Control (MAC) Control Element (CE) for BFR to a base station, where the MAC CE for BFR includes a cell information field indicating information of a serving cell in which the BFR procedure is triggered, and a presence indicator field indicating whether an identity of a preferred Reference Signal (RS) for BFR is included in the MAC CE for BFR. The preferred RS is associated with the serving cell.

10 Claims, 8 Drawing Sheets

(56) References Cited

U.S. PATENT DOCUMENTS

| | | | |
|---|---|---|---|
| 2020/0260428 A1* | 8/2020 | Xu | H04L 5/0048 |
| 2020/0288371 A1* | 9/2020 | Zhou | H04W 36/36 |
| 2020/0288479 A1* | 9/2020 | Xi | H04B 7/02 |
| 2020/0413469 A1* | 12/2020 | Wu | H04W 76/19 |
| 2021/0021320 A1* | 1/2021 | Koskela | H04B 7/0626 |
| 2021/0058873 A1* | 2/2021 | Gao | H04L 25/0226 |

OTHER PUBLICATIONS

InterDigital Inc., BFR on SCell 3GPP TSG-RAN WG2, RAN2#102, Busan, Republic of Korea, May 21-25, 2018, R2-1806821, May 31, 2018(May 31, 2018), the whole document.

InterDigital Inc., Corrections BFR on SCell 3GPP TSG-RAN WG2, RAN2#102, Busan, Republic of Korea, May 21-25, 2018, R2-1806822, May 31, 2018(May 31, 2018), the whole document.

\* cited by examiner

| | | | | | | | | |
|---|---|---|---|---|---|---|---|---|
| C7 216 | C6 214 | C5 212 | C4 210 | C3 208 | C2 206 | C1 204 | C0 202 | Oct 1 |
| Cell ID #1 218 | | | | RS ID #1 220 | | | | Oct 2 |
| Cell ID #2 222 | | | Cell ID #3 224 | | | RS ID #3 226 | | Oct 3 |
| RS ID #3 226 | | | Cell ID #5 228 | | | Cell ID #6 230 | | Oct 4 |
| Cell ID #6 230 | RS ID #6 232 | | | | | R 234 | R 236 | Oct 5 |

METHODS AND APPARATUSES FOR BEAM FAILURE RECOVERY

CROSS-REFERENCE TO RELATED APPLICATION(S)

The present application claims the benefit of and priority to a provisional U.S. Patent Application Ser. No. 62/806,087, filed on Feb. 15, 2019, entitled "BFRQ and BFRR Procedure in MAC," (hereinafter referred to as "US76553 application") and a provisional U.S. Patent Application Ser. No. 62/825,321, filed on Mar. 28, 2019, entitled "Configured Grant Based BFRQ Transmission," (hereinafter referred to as "US76867 application"). The contents of the US76553 application and the US76867 application are hereby incorporated fully by reference into the present application.

FIELD

The present disclosure generally relates to wireless communications, and more particularly, to methods and apparatuses for Beam Failure Recovery (BFR).

BACKGROUND

In wireless communication systems such as Long-Term Evolution (LTE) systems, a User Equipment (UE) may continuously monitor the link quality of the serving cell to ensure efficient signal coverages. If the link quality is considered to be poor (e.g., the value of a Beam Failure Indication (BFI) counter maintained by the Medium Access Control (MAC) entity of the UE exceeds a predefined threshold), the UE may trigger a BFR procedure to request for beam recovery.

However, in the next generation (e.g., the fifth-generation (5G) New Radio (NR)) wireless communication systems, a UE may be configured with multiple serving cells (e.g., a Primary Cell (PCell) and one or more Secondary Cells (SCells)) to promote data throughput, system capability, transmission reliability, etc. The current BFR mechanism may not be adequate for UEs operating on multiple serving cells.

Therefore, there is a need in the art for an improved BFR procedure for the next-generation wireless communication system.

SUMMARY

The present disclosure is directed to methods and apparatuses for BFR.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to perform at least one BFR procedure. The at least one BFR procedure includes transmitting a MAC Control Element (CE) for BFR to a base station, where the MAC CE for BFR includes a cell information field indicating information of a serving cell in which the BFR procedure is triggered, and a presence indicator field indicating whether an identity of a preferred Reference Signal (RS) for BFR is included in the MAC CE for BFR. The preferred RS may be associated with the serving cell.

According to another aspect of the present disclosure, a method performed by a UE is provided. The method includes performing at least one BFR procedure. The at least one BFR procedure includes transmitting a MAC CE for BFR to a base station, where the MAC CE for BFR includes a cell information field indicating information of a serving cell in which the BFR procedure is triggered, and a presence indicator field indicating whether an identity of a preferred RS for BFR is included in the MAC CE for BFR. The preferred RS may be associated with the serving cell.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
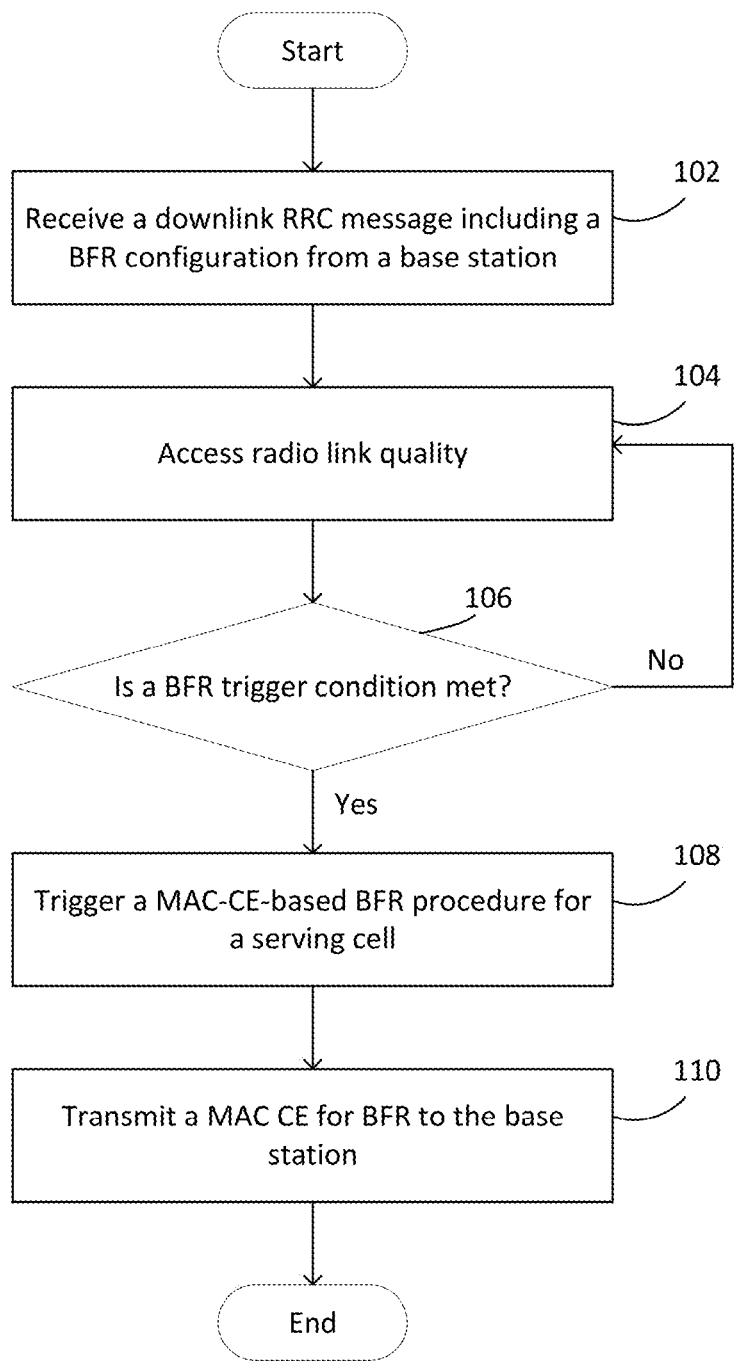
FIG. 1 is a flowchart of a method by a UE for BFR, in accordance with an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes, but is not limited to, Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one Base Station (BS), at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects and represents that three relationships may exist. For example, A and/or B may indicate that: A exists alone, A and B exist at the same time, or B exists alone. In addition, the character "/" herein generally represents that the former and latter associated objects are in an "or" relationship.

A BFR procedure may be applied by a UE to indicate a new serving beam to the serving gNB (e.g., by indicating a new Synchronization Signal Block (SSB) or Channel State Information (CSI-RS)) when a beam failure event is detected on the serving SSB(s)/CSI-RS(s). The BFR procedure may be triggered when the detection result of a Beam Failure Detection (BFD) procedure meets certain criteria. For example, during the BFD procedure, the MAC entity of the UE may count the number of Beam Failure Indications (BFIs) transmitted from the lower layer (e.g., Physical (PHY) layer). When the number of BFIs for a serving cell reaches a threshold value, the MAC entity of the UE may consider that a beam failure event is detected on the serving cell. In some implementations, the MAC entity of the UE may maintain a BFI counter (e.g., provided in the BFI COUNTER Information Element (IE)) to count the number of BFI received from the PHY layer. During the BFD procedure, the PHY layer may deliver a BFI to the MAC entity of the UE when certain beam measurement criteria are satisfied.

In some implementations, the MAC entity of a UE may trigger a Random Access (RA) procedure for a PCell when the BFI counter reaches a predefined or configured threshold value (e.g., the maximum number of BFI, which may be provided in the beamFailureInstanceMaxCount IE). The MAC entity may also maintain a BFD timer for the BFD procedure and a BFR timer for the BFR procedure. For example, once the MAC entity of the UE receives a first BFI from the PHY layer, the BFD timer may start or restart. The MAC entity of the UE may count and accumulate the number of BFIs from the PHY layer when the BFD timer is running. When the BFD timer expires, the MAC entity may reset the BFI counter (e.g., set to zero). In some implementations, the BFD timer, the BFR timer, and the beamFailureInstanceMaxCount IE may be configured with initial values by the base station (e.g., a gNB) through the Radio Resource Control (RRC) layer.

Carrier Aggregation (CA) technology may be supported with NR systems, and a UE may be configured with multiple serving cells based on the CA architecture. The serving cells may include a PCell and one or more SCells, where the PCell may be deployed in Frequency Range 1 (FR1) (e.g., below 6 GHz) for reliable control information transmission and the SCell(s) may be deployed in Frequency Range 2 (FR2) (e.g., above 6 GHz) for higher data throughput. However, considering the problem of beam blockage (e.g., beam failure) which often happens in FR2, it may be required for an improved BFR procedure for handling the beam failure event detected on the PCell and the SCell(s).

Additionally, in current wireless communication systems, when the MAC entity of a UE receives a request for initiating a new RA procedure while the MAC entity is running another RA procedure, it may be up to specific UE implementations to determine whether the UE needs to continue the ongoing/running RA procedure or stop the ongoing/running RA procedure and initiate the new RA procedure. However, during the BFD procedures (e.g., which are operated on multiple cells associated to a MAC entity for CA), it may be possible that there are multiple RA procedures requested to be initiated for multiple cells at the same time, and/or that an RA procedure may be requested to be initiated when another RA procedure is running.

Moreover, to operate BFR procedures on multiple serving cells, a flexible and scalable MAC-CE-based BFR procedure may be needed. In some implementations, each MAC-CE-based BFR procedure may be triggered based on a per serving cell basis. For example, when a beam failure event is detected on an SCell, the UE may trigger a corresponding MAC-CE-based BFR procedure for the SCell.

FIG. 1 is a flowchart of a method by a UE for BFR, in accordance with an example implementation of the present application.

In action 102, the UE may receive a Downlink (DL) RRC message including a BFR (or BFR-related) configuration from a base station. For example, the base station (e.g., a gNB) may configure Access Stratum (AS) layer information to the UE via the DL RRC message, where one or more BFR (or BFR-related) configurations may be contained in the DL RRC message. In some implementations, the BFR (or BFR-related) configuration may be provided in a beam failure recovery configuration IE (e.g., the BeamFailureRecoveryConfig IE), and/or a Radio Link Monitoring (RLM)-specific IE such as the RadioLinkMonitoringConfig IE.

In action 104, the UE may access the radio link quality of one or more serving cells. For example, the UE may perform measurements and estimate the radio link quality of the serving cells based on certain measurement metrics. If the radio link quality of a particular serving cell is considered to be poor, the PHY layer of the UE may transmit a BFI to the MAC entity.

In action 106, the UE may determine whether a BFR trigger condition for a serving cell is met. For example, the MAC entity of the UE may count the number of BFIs for the serving cell when the BFD timer is running. The UE may consider that the BFR trigger condition for the serving cell is met when the number of BFI reaches a predefined or configured value.

When the BFR trigger condition for the serving cell is met, the UE (e.g., the MAC entity of the UE) may consider that a beam failure event is detected on the serving cell. Then, in action 108, the UE may trigger a MAC-CE-based BFR procedure for the serving cell.

In action 110, the UE (e.g., the MAC entity of the UE) may transmit a MAC CE for BFR to the base station (e.g., a serving gNB) during the MAC-CE-based BFR procedure, where the MAC CE for BFR may be transmitted through an Uplink (UL) resource of a Physical Uplink Shared Channel (PUSCH). In some implementations, the MAC CE for BFR may be identified by a header of a MAC sub-Protocol Data Unit (sub-PDU) with a dedicated Logical Channel Identity (LCID). For example, the dedicated LCID may correspond to a MAC CE type of a Beam Failure Recovery Request (BFRQ). In this manner, the MAC CE for BFR may be considered as a BFRQ MAC CE that contains a BFRQ for BFR. It should be noted that the term "MAC CE for BFR" and the term "BFRQ MAC CE" may be interchangeable in some implementations of the present application.

In some implementations, the MAC CE for BFR (e.g., BFRQ MAC CE) may include at least one of a cell information field, a presence indicator field, and an RS Identity (ID) field. The cell information field may indicate information of a serving cell in which the BFR procedure is triggered or a beam failure event is detected, where the serving cell may be referred to as a "failed cell" for short. In some implementations, each cell information field in the MAC CE for BFR may explicitly indicate the cell ID of the failed cell. In other implementations, each cell information field may implicitly indicate the cell ID of the failed cell according to specific mapping rules (e.g., depending on a descending/ascending order of the cell IDs of all configured serving cells). For example, each serving cell configured to the UE may have a corresponding MAC-CE-based BFR configuration, and each cell information field may be, but not limited to, a 3-bit indicator, where "000" indicates an SCell having the smallest/largest cell ID value among all SCells configured with the MAC-CE-based BFR configurations, "001" indicates an SCell having the second smallest/largest cell ID value, and so on. In this manner, the length of each cell information field may be reduced because the cell information field does not need to contain the entire cell ID. In other implementations, each cell information field may indicate whether the cell ID of the corresponding failed cell is contained in the MAC CE for BFR (e.g., "1" means the MAC CE for BFR contains the cell ID of the failed cell corresponding to the cell information field, and "0" means the MAC CE for BFR does not contain the cell ID of the corresponding failed cell).

In some implementations, the presence indicator field may indicate whether an ID of a preferred RS for BFR is included in the MAC CE for BFR, where the preferred RS may be associated with (e.g., provided by) a serving cell in which the BFR procedure is triggered or a beam failure event is detected. For example, in a case that the presence indicator field is provided in the MAC CE for BFR, the MAC CE for BFR may include an RS ID field that indicates the ID of the preferred RS for BFR (e.g., for the BFR procedure) when the presence indicator is set to a specific value (e.g., a bit value of "1"). In some implementations, each presence indicator field may be, but is not limited to, a 1-bit indicator, where the i-th presence indicator ($C_i$) in the MAC CE for BFR may be set to "1" to indicate that the RS ID field for the corresponding failed cell # i is included in the MAC CE for BFR, or set to "0" to indicate that RS ID field for the corresponding failed cell # i is not included in the MAC CE for BFR. In other implementations, each presence indicator field may indicate whether the corresponding serving cell has triggered a MAC-CE-based BFR procedure. For example, the i-th presence indicator ($C_i$) in the MAC CE for BFR may be set to "1" to indicate that the corresponding serving cell # i has triggered a MAC-CE-based BFR procedure, or set to "0" to indicate that the corresponding serving cell # i does not trigger a MAC-CE-based BFR procedure, where the serving cell that has triggered the MAC-CE-based BFR procedure may be considered as a failed cell in which the BFR procedure is triggered or a beam failure event is detected.

In some implementations, each RS ID field may include an ID of a preferred RS for BFR, where the preferred RS ID may be associated with a new beam of a serving cell (in which the MAC-CE-based BFR procedure is triggered or a beam failure event is detected), which may be selected by the UE to recover the radio link. The RS ID field may be implemented in various ways. For example, each RS ID field may explicitly indicate the RS ID of the preferred RS for BFR. In another example, each RS ID field may implicitly indicate the RS ID of the preferred RS for BFR. For example, each RS ID field may be, but is not limited to, a 4-bit indicator, where the 4-bit indicator may be set to "0000" to indicate an RS having the smallest/largest RS ID value among all RSs which are configured for the corresponding MAC-CE-based BFR procedure, and set to "0001" to indicate an RS having the second smallest/largest RS ID value, and so on. In some implementations, the ID of the preferred RS for BFR (which may be referred to as the preferred RS ID) may be configured by the beam failure recovery configuration IE in the BFR configuration.

As described above, by transmitting the MAC CE for BFR (e.g., BFRQ MAC CE), the UE may implicitly or explicitly indicate to the base station in which serving cell the beam failure event is detected or the BFR procedure is triggered, and/or which RS of the failed cell the UE prefers for the BFR procedure. The base station may consider the preferred RS(s) indicated by the UE as candidate RS(s)/beam(s) when performing beam recovery with the UE.

In some implementations, the MAC entity of the UE may be configured by the base station with a set of parameters for the MAC-CE-based BFR procedure(s). For example, the set of parameters may include at least one of the following:

BFRQ_TransMax: Maximum number of BFRQ MAC CE transmissions on a PUSCH; and
BFRQ_ProhibitTimer: Timer that the UE is prohibited from transmitting a BFRQ MAC CE on a PUSCH when the timer is running.

In some implementations, each set of parameters for the MAC-CE-based BFR procedure(s) may be configured based on a per serving SCell basis. For example, the MAC entity of the UE may be configured with a first set of parameters for a first serving cell and configured with a second set of parameters for a second serving cell, where the first set of parameters may be different from (or independent of) the second set of parameters. In other implementations, all serving SCells may share a common set of parameters.

In some implementations, the MAC entity of the UE may maintain a set of variables for each MAC-CE-based BFR procedure. For example, the set of variables may include the following:

BFRQ_Counter: Counter for counting the number of BFRQ MAC CE being transmitted.

In some implementations, each set of variables for the MAC-CE-based BFR procedure(s) may be configured based on a per serving SCell basis. For example, the UE may maintain a first BFRQ_Counter for a first MAC-CE-based BFR procedure of a first serving SCell and maintain a second BFRQ_Counter for a second MAC-CE-based BFR procedure of a second serving SCell.

Example formats of the MAC CE for BFR (e.g., BFRQ MAC CE) are described with reference to FIGS. 2A, 2B, 3, 4, and 5. It should be noted that the MAC CE formats shown in FIGS. 2A, 2B, 3, 4, and 5 are for illustrative purposes only, and not intended to limit the scope of the present application. In some implementations, the number, length, or any other arrangements of each field in the BFRQ MAC CE may be adjusted, depending on, for example, actual supported MAC CE formats.

Figure 2A:
FIGS. 2A and 2B are schematic diagrams each illustrating an example format of a Beam Failure Recovery Request (BFRQ) MAC CE, in accordance with example implementations of the present application.

FIG. 2A is schematic diagram illustrating an example format of a BFRQ MAC CE, in accordance with an example implementation of the present application. As shown in FIG. 2A, BFRQ MAC CE 201 includes presence indicator fields 202, 204, 206, 208, 210, 212, 214 and 216, cell information fields 218, 222, 224, 228 and 230, RS ID fields 220, 226 and 232, and reserved bit fields 234 and 236.

In the example implementation, BFRQ MAC CE 201 includes the cell IDs of serving cells #1, #2, #3, #5 and #6 (e.g., Cell IDs #1, #2, #3, #5 and #6) in cell information fields 218, 222, 224, 228 and 230, respectively, which means that the UE may have detected beam failure events on these serving cells. In addition, each presence indicator field may correspond to a serving cell and used for indicating whether the preferred RS ID of the corresponding serving cell is included in the BFRQ MAC CE. For example, each presence indicator field may include, but is not limited to, a 1-bit presence indicator (C0 to C7), where the 1-bit presence indicator may be set to "1" to indicate that the preferred RS ID of the corresponding serving cell is included in BFRQ MAC CE 201, or set to "0" to indicate the opposite situation. For example, in a case where the values of the presence indicators [C7, C6, C5, C4, C3, C2, C1, C0]=[0, 1, 0, 0, 1, 0, 1, 0], when the base station receives BFRQ MAC CE 201, the base station may know that the RS ID #1, the RS ID #3 and the RS ID #6, which correspond to the serving cell #1 (with the Cell ID #1), the serving cell #3 (with the Cell ID #3) and the serving cell #6 (with the Cell ID #6), respectively, are included in BFRQ MAC CE 201. The base station may consider the RSs with the RS ID #1, the RS ID #3 and the RS ID #6 as candidate RSs/beams that are suitable for beam recovery. On the other hand, reserved bit fields 234 and 236 may contain reserved bits (R).

Figure 2B:
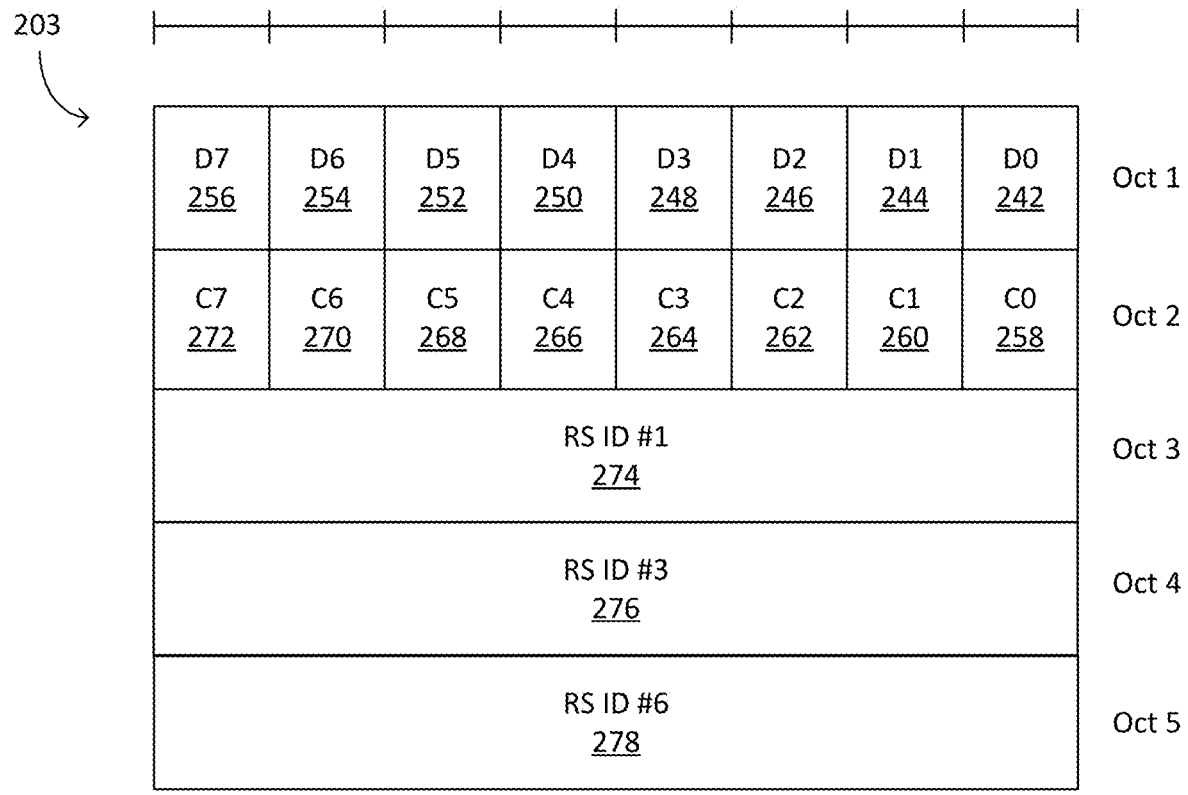

FIG. 2B is schematic diagram illustrating an example format of a BFRQ MAC CE in accordance with another example implementation of the present application. As shown in FIG. 2B, BFRQ MAC CE 203 includes cell information fields 242, 244, 246, 248, 250, 252, 254 and 256, presence indicator fields 258, 260, 262, 264, 266, 268, 270 and 272, and RS ID fields 274, 276 and 278.

In the example implementation, each of cell information fields 242, 244, 246, 248, 250, 252, 254 and 256 may correspond to a serving cell and used for indicating whether the corresponding serving cell has failed due to a beam failure event. For example, each cell information field may include, but is not limited to, a 1-bit cell indicator (D0 to D7), where the 1-bit cell indicator may be set to "1" to indicate that the corresponding serving cell has failed due to a beam failure event, or set to "0" to indicate the opposite situation. For example, in a case where the values of the cell indicators [D7, D6, D5, D4, D3, D2, D1, D0]=[0, 1, 1, 0, 1, 1, 1, 0], once the base station receives BFRQ MAC CE 203, the base station may know that the serving cells #1, #2, #3, #5 and #6 have failed due to beam failure events.

Presence indicator fields 258, 260, 262, 264, 266, 268, 270 and 272 correspond to and substantially have the same function as presence indicator fields 202, 204, 206, 208, 210, 212, 214 and 216 illustrated in FIG. 2A. For example, in a case where the values of the presence indicators [C7, C6, C5, C4, C3, C2, C1, C0]=[0, 1, 0, 0, 1, 0, 1, 0], once the base station receives BFRQ MAC CE 203, the base station may know that the RS ID #1, the RS ID #3 and the RS ID #6, which correspond to the serving cell #1, the serving cell #3 and the serving cell #6, respectively, are included in RS ID fields 274, 276 and 278 of BFRQ MAC CE 203. The base station may consider that the RSs with the RS ID #1, the RS ID #3 and the RS ID #6 are candidate RSs/beams that are suitable for beam recovery.

Figure 3:
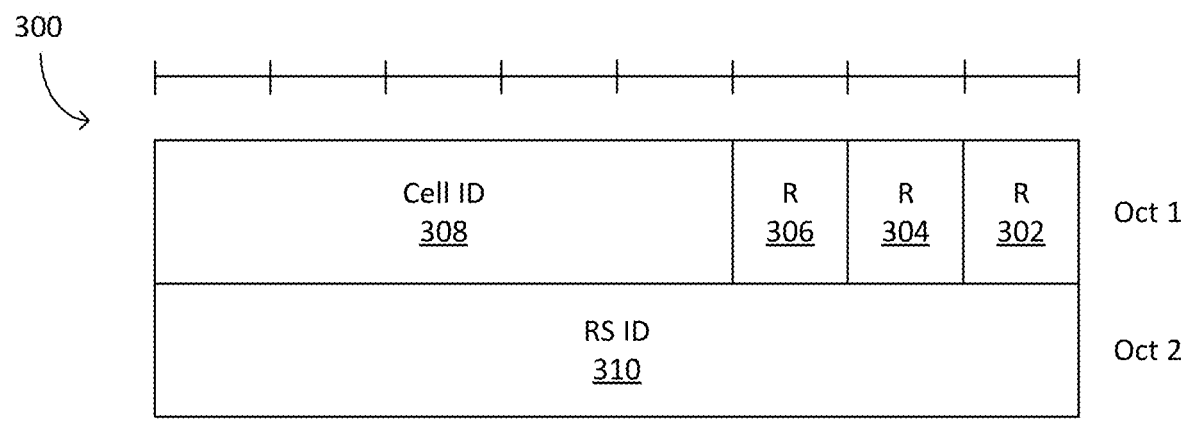
FIG. 3 is schematic diagram illustrating an example format of a BFRQ MAC CE in accordance with another example implementation of the present application.

FIG. 3 is schematic diagram illustrating an example format of a BFRQ MAC CE in accordance with another example implementation of the present application. As shown in FIG. 3, BFRQ MAC CE 300 has a two-byte format, which includes cell information field 308, reserve bit fields 302, 304 and 306, and RS ID field 310. Cell information field 308 may include the cell ID of a serving cell in which the BFR procedure is triggered or a beam failure event is detected. RS ID field 310 may include the RS ID of a preferred RS that is associated with the indicated serving cell and deemed suitable for BFR by the UE. In the example implementation, cell information field 308 has a field length of 5 bits and RS ID field 310 has a field length of 8 bits, so the format of BFRQ MAC CE 300 may support a beam failure reporting of up to 32 serving cells and up to 128 RS resources.

Figure 4:
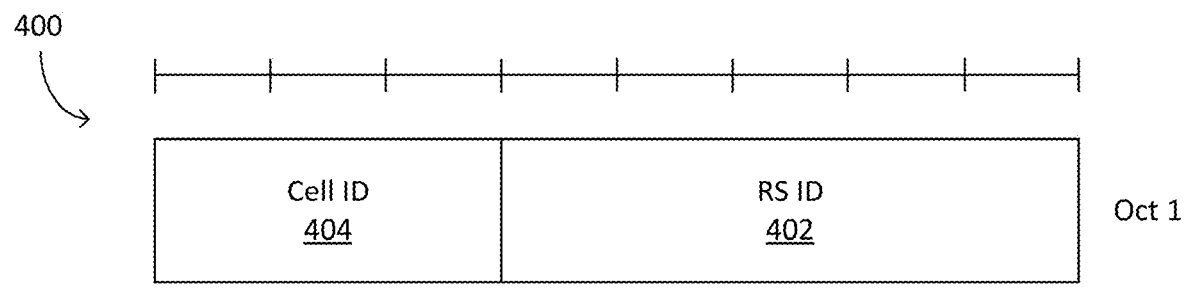
FIG. 4 is schematic diagram illustrating an example format of a BFRQ MAC CE in accordance with another example implementation of the present application.

FIG. 4 is schematic diagram illustrating an example format of a BFRQ MAC CE in accordance with another example implementation of the present application. As shown in FIG. 4, BFRQ MAC CE 400 has a one-byte format, which includes cell information field 404 and RS ID field 402. Similar to BFRQ MAC CE 300 illustrated in FIG. 3, cell information field 404 may include the cell ID of a serving cell in which the BFR procedure is triggered or a beam failure event is detected, and RS ID field 402 may include the RS ID of a preferred RS that is associated with the serving cell and deemed suitable for BFR by the UE. In the example implementation, cell information field 404 has a field length of 3 bits and RS ID field 402 has a field length of 5 bits, so the format of BFRQ MAC CE 400 may support a beam failure reporting of up to 8 serving cells and up to 32 RS resources.

Figure 5:
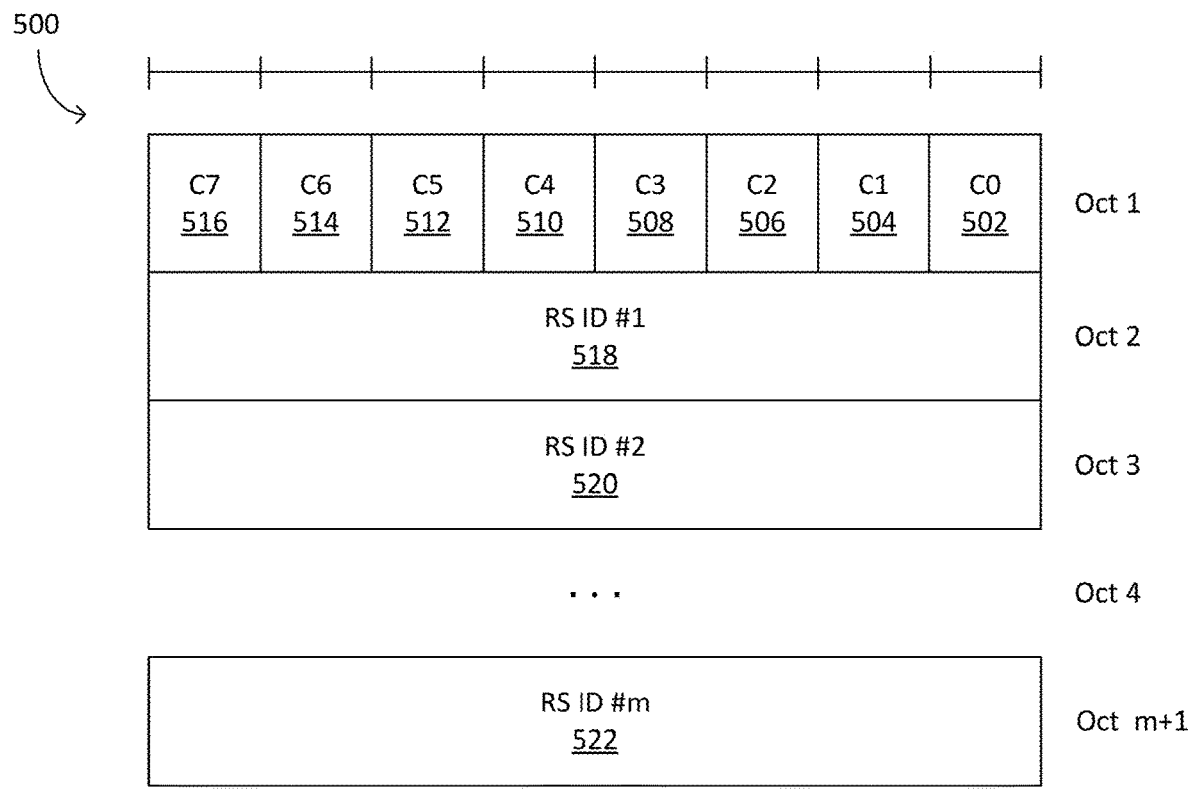
FIG. 5 is schematic diagram illustrating an example format of a BFRQ MAC CE in accordance with another example implementation of the present application.

FIG. 5 is schematic diagram illustrating an example format of a BFRQ MAC CE in accordance with another example implementation of the present application. As shown in FIG. 5, BFRQ MAC CE 500 includes eight presence indicator fields 502, 504, 506, 508, 510, 512, 514 and 516 and m RS ID fields, where m is a positive integer no greater than eight (depending on the number of the presence indicator fields).

In the example implementation, each of presence indicator fields 502, 504, 506, 508, 510, 512, 514 and 516 may correspond to a serving cell and used for indicating whether the preferred RS ID of the corresponding serving cell is included in BFRQ MAC CE 500. As shown in FIG. 5, RS ID fields 518, 520 and 522 include the preferred RS ID #1, the preferred RS ID #2 and the preferred RS ID # m, respectively. In addition, because BFRQ MAC CE 500 has an 8-bit bitmap comprising presence indicator fields 502, 504, 506, 508, 510, 512, 514 and 516 and each RS ID field also has a field length of 8 bits, the format of BFRQ MAC CE 500 may support a beam failure reporting up to 8 serving cells and up to 128 RS resources.

It should be noted that the example BFRQ MAC CE formats described in various implementations of the present application may be combined and/or modified according to actual needs or applications. For example, one or more fields of different/same BFRQ MAC CEs may be combined and thus form as a new BFRQ MAC CE. Moreover, in addition to the cell information fields, the presence indicator fields, the RS ID fields and the reserved bit fields, the BFRQ MAC CE may include other information for additional purposes. For example, one or more additional fields may be provided in the BFRQ MAC CE to indicate whether a specific RS ID field is the last one of the RS ID fields included in the BFRQ MAC CE. Such field(s) may help the base station (e.g., a gNB) to realize how many RS ID fields are included in the BFRQ MAC CE. Furthermore, depending on the number of the serving cells configured for each MAC entity of the UE and the number of RS resources configured for each serving cell by the base station (e.g., a gNB), the number of bits in each field of a BFRQ MAC CE may vary. For example, the field length of a field in the BFRQ MAC CE may be scaled to meet the number of serving cells and/or RS resources configured to the UE.

As described above, the MAC CE for BFR (e.g., BFRQ MAC CE) may be identified by a header of a MAC sub-PDU with a dedicated LCID. In some implementations, for a MAC-CE-based BFR procedure triggered for a corresponding serving cell (e.g., an SCell), the UE may apply one of the following BFRQ MAC CE formats according to certain criteria (e.g., the size of UL resources granted to the UE).

Short BFRQ MAC CE format (fixed size);
Long BFRQ MAC CE format (variable size);
Short Truncated BFRQ MAC CE format (fixed size); and
Long Truncated BFRQ MAC CE format (variable size).

In some implementations, each BFRQ MAC CE format may be identified by a dedicated LCID. As shown in Table 1, when the index of the LCID is set to "50", it means that the BFRQ MAC CE format applies the Short BFRQ MAC CE format.

TABLE 1

| Index | LCID values |
|---|---|
| 0 | Common Control Channel (CCCH) of size 64 bits |
| 1-32 | Identity of the logical channel |
| 33-47 | Reserved |
| 48 | Short Truncated BFRQ |
| 49 | Long Truncated BFRQ |
| 50 | Short BFRQ |
| 51 | Long BFRQ |
| 52 | CCCH of size 48 bits |
| 53 | Recommended bit rate query |
| 54 | Multiple Entry Power Headroom Report (PHR) |
| 55 | Configured Grant (CG) Confirmation |
| 56 | Multiple Entry PHR |
| 57 | Single Entry PHR |
| 58 | Cell Radio Network Temporary Identifier (C-RNTI) |
| 59 | Short Truncated Buffer Status Report (BSR) |
| 60 | Long Truncated BSR |
| 61 | Short BSR |
| 62 | Long BSR |
| 63 | Padding |

In some implementations, the UE may apply the Short BFRQ MAC CE format when there is only a small amount of BFRQ information to be reported to the base station. For example, the BFRQ MAC CE format illustrated in FIG. 3 or 4 may be used as the Short BFRQ MAC CE format.

In some implementations, the UE may apply the Short Truncated BFRQ MAC CE format when the UL resource is limited/insufficient and the entire BFR information cannot be transmitted to the base station in a single BFRQ MAC CE (e.g., only parts of the serving cell IDs/preferred RS IDs/presence indicators are reported in the BFRQ MAC CE). For example, the BFRQ MAC CE format illustrated in FIG. 3 or 4 may be used as the Short Truncated BFRQ MAC CE format. When receiving a BFRQ MAC CE with the Short Truncated BFRQ MAC CE format, the base station may know that the UE cannot report all serving cell ID(s)/preferred RS ID(s)/presence indicator(s) in a single BFRQ MAC CE, and the base station may expect that the UE may transmit another one or more BFRQ MAC CEs during the MAC-CE-based BFR procedure.

In some implementations, the UE may apply the Long BFRQ MAC CE format to generate the BFRQ MAC CE when the size of the granted UL resource is enough for the UE to transmit the entire BFRQ information in a single BFRQ MAC CE. For example, the BFRQ MAC CE format illustrated in FIG. 2A, 2B or 5 may be used as the Long BFRQ MAC CE format.

In some implementations, the UE may apply the Long Truncated BFRQ MAC CE format when the size of the granted UL resource is not enough for the UE to include the entire BFRQ information in a single BFRQ MAC CE. For example, the BFRQ MAC CE format illustrated in FIG. 2A, 2B or 5 may be used as the Long Truncated BFRQ MAC CE format. When receiving a BFRQ MAC CE with the Long Truncated BFRQ MAC CE format, the base station may know that the UE cannot report all serving cell IDs/preferred RS IDs/presence indicators in a single BFRQ MAC CE, and the base station may expect that the UE may transmit another one or more BFRQ MAC CEs during the MAC-CE-based BFR procedure.

In some implementations, only less than four of the BFRQ MAC CE formats described above may be configured by the base station (e.g., a gNB) for each MAC-CE-based BFR procedure. For example, the UE may only apply the Short BFRQ MAC CE format and the Short Truncated BFRQ MAC CE format when performing the MAC-CE-based BFR procedure. In another example, the UE may only apply the Short BFRQ MAC CE format when performing a MAC-CE-based BFR procedure in a case that the MAC entity of the UE is capable of performing/triggering only one MAC-CE-based BFR procedure at a time. The use of the BFRQ MAC CE formats may be individually configured by the base station (e.g., a gNB) based on a per MAC-CE-based BFR procedure basis.

In some implementations, the MAC-CE-based BFR procedures may be separately/independently triggered for each serving SCell if the BFR function of each serving SCell is configured and/or enabled. In some implementations, when the BFR function for an SCell is configured, it means that the UE may be configured with one or more MAC-CE-based BFR configurations by the base station (e.g., a gNB). When the BFR function for an SCell is enabled, it means that the UE may be configured with one or more MAC-CE-based BFR configurations for the SCell by the base station, with some implicit or explicit mechanisms being provided to activate or deactivate the BFR function of the UE/MAC entity/serving cell.

Figure 6:
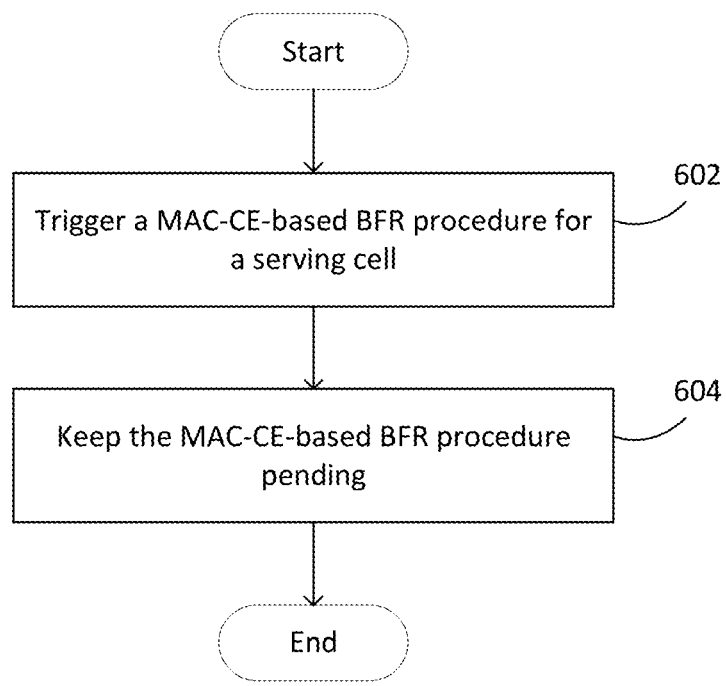
FIG. 6 is a flowchart of a MAC-CE-based BFR procedure by a UE, in accordance with an example implementation of the present application.

FIG. 6 is a flowchart of a MAC-CE-based BFR procedure by a UE, in accordance with an example implementation of the present application.

In action 602, the UE may trigger the MAC-CE-based BFR procedure for a serving cell.

In action 604, the UE may keep the MAC-CE-based BFR procedure pending after triggering the MAC-CE-based BFR procedure. For example, once the MAC-CE-based BFR procedure has been triggered, the MAC-CE-based BFR procedure may be considered pending until the procedure is cancelled. In other implementations, the MAC-CE-based BFR procedure may not have a pending state but have a trigged and a non-triggered state.

In some implementations, the MAC entity of the UE may build (or generate) or transmit the BFRQ MAC CE after triggering the MAC-CE-based BFR procedure. In other implementations, the BFRQ MAC CE may be built or transmitted after the MAC-CE-based BFR procedure is triggered and some other conditions are satisfied (e.g., an RA-based BFR procedure is running).

In some implementations, when performing a MAC PDU assembly and multiplexing procedure (e.g., building a MAC PDU for a new transmission when an UL resource of a PUSCH is granted by the gNB), the MAC entity of the UE may include a BFRQ MAC CE in the MAC PDU when there is at least one MAC-CE-based BFR procedure pending on the MAC entity. During the MAC PDU assembly and multiplexing procedure, the BFRQ MAC CE format selection (e.g., selecting one of the Short/Short Truncated/Long/Long Truncated BFRQ MAC CE formats to use) may be depended on the number of the pending MAC-CE-based BFR procedures and/or the size of the UL grants for the MAC PDU transmission indicated by the lower layer (e.g., a PHY layer). In other implementations, the BFRQ MAC CE format selection may further depend on whether the SCell that triggers the MAC-CE-based BFR procedure is currently allowed to indicate a new beam to the base station (e.g., a gNB). In some implementations, some implicit or explicit mechanisms may be provided to control whether the new beam information (e.g., the RS ID fields illustrated in FIGS. 2A, 2B, 3, 4 and 5) for a failed cell is allowed to be indicated by the MAC entity of the UE. For example, a masking parameter that is configured based on a per SCell basis may be provided to the base station (e.g., a gNB) to implement the abovementioned control mechanism.

A corresponding Text Proposal (TP) example is shown in Table 2-1.

TABLE 2-1

Table 2-1 TP of the BFRQ MAC CE transmission

As long as at least one MAC-CE-based BFR procedure is pending, while performing MAC PDU assembly and multiplexing for a new transmission, the MAC entity shall:
   1> If more than one MAC-CE-based BFR procedure is pending when the MAC PDU containing the BFRQ is to be built:
      2> if the UL grant for the MAC PDU transmission is equal to or larger than the size of the Long BFRQ MAC CE plus its header:
         3> reports Long BFRQ MAC CE;
      2> else if the UL grant for the MAC PDU transmission is equal to or larger than the size of the Long Truncated BFRQ MAC CE plus its header:
         3> reports Long Truncated BFRQ MAC CE;
      2> else:
         3> reports Short Truncated BFRQ MAC CE;
   1> else:
      2> reports Short BFRQ MAC CE.

In some implementations, only the Short and the Short Truncated BFRQ MAC CE formats may be applied. A corresponding TP example is shown in Table 2-2.

TABLE 2-2

TAble 2-2 TP of the BFRQ MAC CE transmission

As long as at least one MAC-CE-based BFR procedure is pending, while performing MAC PDU assembly and multiplexing for a new transmission, the MAC entity shall:
   1> If more than one MAC-CE-based BFR procedure is pending when the MAC PDU containing the BFRQ is to be built:
      2> reports Short Truncated BFRQ MAC CE;
   1> else:
      2> reports Short BFRQ MAC CE.

In some implementations, only the Short BFRQ MAC CE format may be applied (e.g., because the MAC entity of the UE is capable of triggering or performing only one MAC-CE-based BFR procedure at a time). A corresponding TP example is shown in Table 2-3.

TABLE 2-3

Table 2-3 TP of the BFRQ MAC CE transmission

Once the MAC-CE-based BFR procedure is pending, while performing MAC PDU assembly
and multiplexing for a new transmission, the MAC entity shall:
   1> reports Short BFRQ MAC CE.

It should be noted that the format selection behaviors described above are only for illustrative purposes. The format selection and BFRQ MAC CE reporting behavior may be determined based on actual supporting MAC CE formats.

In some implementations, when generating a Long/Short Truncated BFRQ MAC CE, the MAC entity of the UE may rank or sort the reporting order of the (preferred) RS IDs in all the pending MAC-CE-based BFR procedures by considering at least one of the following factors: (1) the cell ID of the serving cell triggering the MAC-CE-based BFR procedure, (2) the Timing Advance Group (TAG) (or TAD ID) of the serving cell triggering the MAC-CE-based BFR procedure, (3) configured BFRQ parameters conditions, such as the timer status and the transmission count, corresponding to each serving cell (e.g., the serving cell having largest or smallest transmission count for the BFRQ MAC CE may be prioritized to be included in the Long Truncated or Short Truncated BFRQ MAC CE), (4) whether the serving cell triggering the MAC-CE-based BFR procedure is configured with a Physical Uplink Control Channel (PUCCH), and (5) the cell priority values (implicitly or explicitly) configured by the gNB.

For example, when reporting a Short Truncated or Long Truncated BFRQ MAC CE, the MAC entity of the UE may prioritize reporting of the RS ID of the SCell with the lowest-ranked or highest-ranked serving cell ID, if there are multiple SCells triggering the MAC-CE-based BFR procedures. In some implementations, the serving cell IDs may be ranked by their corresponding values.

In another example, when reporting a Short Truncated or Long Truncated BFRQ MAC CE, the MAC entity of the UE may prioritize reporting of the RS ID of the SCell belonging to the TAG which contains the PCell/PUCCH SCell.

In another example, when reporting a Short Truncated or Long Truncated BFRQ MAC CE, the MAC entity of the UE may prioritize reporting of the RS ID of the SCell with the lowest-ranked or highest-ranked serving cell ID, if there are multiple SCells triggering the MAC-CE-based BFR procedures, where the SCells belong to a TAG including a PCell/PUCCH SCell that triggers the MAC-CE-based BFR procedure.

In another example, when reporting a Short Truncated or Long Truncated BFRQ MAC CE, the MAC entity of the UE may prioritize reporting of the RS ID of the PUCCH SCell, if the PUCCH SCell has triggered a MAC-CE-based BFR procedure.

In another example, when reporting a Short Truncated or Long Truncated BFRQ MAC CE, the MAC entity of the UE may prioritize reporting of the RS ID of the PUCCH SCell having the lowest-ranked or highest-ranked serving cell ID, if there are multiple PUCCH SCells triggering the MAC-CE-based BFR procedures.

In another example, when reporting a Short Truncated or Long Truncated BFRQ MAC CE, the MAC entity of the UE may prioritize reporting of the RS ID of the SCell with the largest or smallest counting value (e.g., the number of BFRQ_Counter), if there are multiple PUCCH SCells triggering the MAC-CE-based BFR procedures.

In some implementations, once the MAC entity of the UE triggers at least one MAC-CE-based BFR procedure, the MAC entity may transmit a BFRQ MAC CE when an Uplink Shared Channel (UL-SCH) (e.g., PUSCH) resource for a new transmission is granted by the base station (e.g., a gNB). In some implementations, the MAC entity of the UE may count the number of the transmitted BFRQ MAC CEs by using a BFRQ_Counter. In other implementations, the MAC entity of the UE may count the number of transmitted BFRQ for each SCell by a corresponding BFRQ_Counter.

In some implementations, once a BFRQ has been transmitted, the transmitted BFRQ MAC CE may contain the BFRQ for the corresponding SCell. In other implementations, once a BFRQ has been transmitted, the transmitted BFRQ MAC CE may contain the (preferred) RS ID of the corresponding SCell. In such cases, if the (preferred) RS ID of the SCell is not included in the BFRQ MAC CE, the value of the BFRQ_Counter for the corresponding SCell may not be increased. Once the value of the BFRQ_Counter reaches (e.g., equal to or larger than) a predetermined threshold value (e.g., BFRQ_TransMax), the MAC-CE-based BFR procedure for the corresponding SCell may be considered to be failed. In some implementations, when a BFRQ MAC CE is transmitted, it means that a MAC PDU that carries the BFRQ MAC CE is built, starting to be transmitted, completely transmitted, or has already delivered to the corresponding Hybrid Automatic Repeat Request (HARQ) process/buffer for transmission. In other implementations, when a BFRQ MAC CE is transmitted, it means that the corresponding Hybrid Automatic Repeat Request Acknowledgement (HARQ_ACK) feedback (e.g., a response from the gNB) of the MAC PDU that carries the BFRQ MAC CE is received. In some implementations, the HARQ_ACK feedback may be implemented by Downlink Control Information (DCI) format 0_0, 0_1, or any other DCI format that is received by the UE on a Physical Downlink Control Channel (PDCCH). The received DCI may contain a New Data Indicator (NDI) with a specific value (e.g., "1") and indicating a HARQ process ID for a HARQ process of a MAC PDU transmission that carries the BFRQ MAC CE.

In some implementations, when a MAC-CE-based BFR procedure is triggered for an SCell, the MAC entity of the UE may start a BFRQ timer. When the BFRQ timer is running, the MAC entity of the UE may transmit a BFRQ MAC CE if an UL-SCH (e.g., PUSCH) resource for a new transmission is granted by the gNB. The MAC entity of the UE may consider that the MAC-CE-based BFR procedure for the corresponding SCell has failed when either the BFRQ_Counter reaches a predetermined threshold value (e.g., BFRQ_TransMax) or the BFRQ timer expires. In some implementations, when the BFRQ timer expires, the MAC entity of the UE may consider that the MAC-CE-based BFR procedure for the corresponding SCell is still valid if the BFRQ_Counter has not reached a predetermined threshold value (e.g., BFRQ_TransMax) (e.g., the MAC entity of the UE applies the Short Truncated or Long Truncated BFRQ MAC CE format to transmit the BFRQ MAC CE during the MAC-CE-based BFR procedure).

In some implementations, a lower layer (e.g., a PHY layer) of the UE may indicate to the MAC entity the (preferred) RS ID in response to the requests form the MAC entity. For example, the lower layer of the UE may indicate the RS ID to the MAC entity only when it receives a corresponding request from the MAC layer. In some implementations, after receiving a request from the MAC layer, the lower layer of the UE may periodically indicate an RS ID to the MAC entity of the UE. The lower layer may keep indicating the preferred RS IDs to the MAC entity of the UE until the corresponding MAC-CE-based BFR procedure has failed or stopped or the lower layer receives an explicit stop indication from the MAC entity. In some implementations, the action of receiving an RS ID from the lower layer (e.g., the PHY layer) and/or the action of requesting the lower layer to indicate an RD ID may be performed in each round of the BFRQ MAC CE transmission, or only be performed one time after the corresponding MAC-CE-based BFR has been triggered.

Since the BFRQ MAC CE may be transmitted on a PUSCH configured by the gNB (e.g., via a CG configuration or dynamic scheduled by the gNB), the time interval of a PUSCH resource grant that is scheduled by the gNB may be static. Hence, it may be beneficial to limit the transmission interval of a BFRQ MAC CE by the MAC entity of the UE by using a BFRQ prohibit timer (e.g., BFRQ_ProhibitTimer) for each SCell that triggers the MAC-CE-based BFR procedure.

In some implementations, the BFRQ prohibit timer (e.g., BFRQ_ProhibitTimer) of an SCell may start when the BFRQ for the corresponding SCell is transmitted (e.g., the transmitted BFRQ MAC CE contains the BFRQ for the corresponding SCell). In another example, when the BFRQ for the corresponding SCell is transmitted, it means that the transmitted BFRQ MAC CE contains the (preferred) RS ID of the corresponding SCell. Conversely, if the BFRQ MAC CE does not include an RS ID of the SCell, the BFRQ prohibit timer for the corresponding SCell may not start. In another example, when the BFRQ for the corresponding SCell is transmitted, it means that the transmitted BFRQ MAC CE may contain at least one of a presence indicator, a cell ID of the SCell, and a (preferred) RS ID for the corresponding SCell.

In some implementations, when the BFRQ prohibit timer for an SCell is running, the MAC entity of the UE may not include the BFRQ for the SCell into the MAC CE.

In some implementations, when the BFRQ prohibit timer for an SCell is running, the MAC entity of the UE may not include an RS ID of the SCell into the MAC CE, but the presence indicator for the corresponding SCell may be included.

In some implementations, the value and time unit of the BFRQ prohibit timer may be configured by the gNB via a DL RRC message, where the time unit may be, but is not limited to, a symbol, a slot, a time period of CG, a subframe, or a millisecond.

A corresponding TP example is shown in Table 3-1.

TABLE 3-1

Table 3-1 TP of the BFRQ MAC CE transmission

As long as at least one MAC-CE-based BFR procedure is pending, while performing MAC
PDU assembly and multiplexing for a new transmission, the MAC entity shall:
    1> If more than one MAC-CE-based BFR procedure is pending and corresponding
BFRQ_ProhibitTimer is not running when the MAC PDU containing the BFRQ is to be built:
        2> if the UL grant for the MAC PDU transmission is equal to or larger than the
size of the Long BFRQ MAC CE plus its header:
            3> reports Long BFRQ MAC CE;
        2> else if the UL grant for the MAC PDU transmission is equal to or larger than
the size of the Long Truncated BFRQ MAC CE plus its header:
            3> reports Long Truncated BFRQ MAC CE;
        2> else:
            3> reports Short Truncated BFRQ MAC CE;
    1> else:
        2> if the pending MAC-CE-based BFR procedure corresponding
BFRQ_ProhibitTimer is not running
            3> reports Short BFRQ MAC CE.

In some implementations, only the Short and the Short Truncated BFRQ MAC CE formats may be applied. A corresponding TP example is shown in Table 3-2.

TABLE 3-2

Table 3-2 TP of the BFRQ MAC CE transmission

As long as at least one MAC-CE-based BFR procedure is pending, while performing MAC
PDU assembly and multiplexing for a new transmission, the MAC entity shall:
    1> If more than one MAC-CE-based BFR procedure is pending and corresponding
BFRQ ProhibitTimer is not running when the MAC PDU containing the BFRQ is to be built:
        2> reports Short Truncated BFRQ MAC CE;
    1> else:
        2> reports Short BFRQ MAC CE.

In some implementations, only the Short BFRQ MAC CE format may be applied. A corresponding TP example is shown in Table 3-3.

TABLE 3-3

Table 3-3 TP of the BFRQ MAC CE transmission

Once the MAC-CE-based BFR procedure is pending and corresponding
BFRQ_ProhibitTimer
is not running, while performing MAC PDU assembly and multiplexing
for a new transmission, the MAC entity shall:
    1> reports Short BFRQ MAC CE;

It should be noted that the format selection behaviors described above are only for illustrative purposes. The format selection and BFRQ MAC CE reporting behavior may be determined based on actual supporting MAC CE formats.

Figure 7:
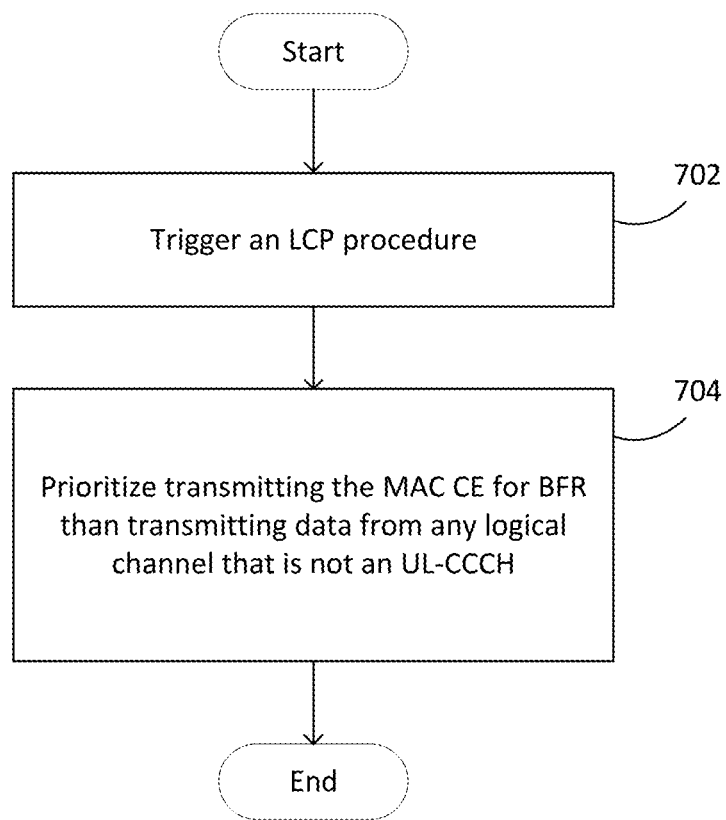
FIG. 7 is a flowchart of a Logical Channel Prioritization (LCP) procedure by a UE, in accordance with an example implementation of the present application.

FIG. 7 is a flowchart of a Logical Channel Prioritization (LCP) procedure by a UE, in accordance with an example implementation of the present application.

In action 702, the UE may trigger an LCP procedure. For example, the LCP procedure may be triggered when a new transmission is performed by the MAC entity of the UE.

In action 704, the UE may prioritize transmitting the MAC CE for BFR (e.g., BFRQ MAC CE) over transmitting data from any logical channel that is not an UL-CCCH.

In some implementations, during the LCP procedure, the logical channels may be prioritized in accordance with the following order (e.g., highest priority listed first):
1) BFRQ MAC CE;
2) C-RNTI MAC CE or data from Uplink Common Control Channel (UL-CCCH);
3) CG confirmation MAC CE;
4) MAC CE for BSR, with exception of BSR included for padding;
5) Single Entry PHR MAC CE or Multiple Entry PHR MAC CE;
6) data from any Logical Channel, except data from UL-CCCH;
7) MAC CE for Recommended bit rate query;
8) MAC CE for BSR included for padding.

In some implementations, during the LCP procedure, the logical channels may be prioritized in accordance with the following order (highest priority listed first):
1) C-RNTI MAC CE or data from UL-CCCH;
2) BFRQ MAC CE;
3) CG confirmation MAC CE;
4) MAC CE for BSR, with exception of BSR included for padding;
5) Single Entry PHR MAC CE or Multiple Entry PHR MAC CE;
6) data from any Logical Channel, except data from UL-CCCH;
7) MAC CE for Recommended bit rate query;
8) MAC CE for BSR included for padding.

In some implementations, during the LCP procedure, the logical channels may be prioritized in accordance with the following order (highest priority listed first):
1) C-RNTI MAC CE or data from UL-CCCH;
2) CG confirmation MAC CE;
3) BFRQ MAC CE;
4) MAC CE for BSR, with exception of BSR included for padding;
5) Single Entry PHR MAC CE or Multiple Entry PHR MAC CE;
6) data from any Logical Channel, except data from UL-CCCH;
7) MAC CE for Recommended bit rate query;

8) MAC CE for BSR included for padding.

In some implementations, the BFRQ MAC CE may be transmitted on a UL grant configured by a CG (which may be configured by a gNB via a specific DL RRC message). The gNB may configure a specific CG configuration to the UE. Some implicit prioritization rules for the usage of the CG and the dynamic grant may be applied. For example, once the MAC-CE-based BFR procedure is triggered, the BFRQ MAC CE may be restricted to be transmitted on the CG only, or the UE may prioritize the BFRQ MAC CE transmission that applies the UL grant configured by the CG over the transmissions that applies the UL grant dynamically scheduled by the PDCCH. In some implementations, the prioritization rules may take the status of the BFRQ prohibit timer (e.g., BFRQ_ProhibitTimer) and/or the BFRQ counter (e.g., BFRQ_Counter) for each SCell into account. In other implementations, the prioritization rules may take the status of the cell ID and/or the TAG ID for each SCell into account. The specific CG may have a different CG type from what is introduced in 3GPP RAN Release 15 (Rel. 15).

Some implicit activation and deactivation mechanism of the specific CG may be provided along with the MAC-CE-based BFR procedure. The activation and deactivation mechanism may be different from the activation and deactivation mechanisms introduced in 3GPP RAN Rel. 15.

In some implementations, the UL resources of a PUSCH for transmitting a BFRQ MAC CE may either be dynamically granted or not dynamically granted. In case of the non-dynamic granted approach, the BFRQ MAC CE may be transmitted via a UL resource of a PUSCH provided by a CG. A BFRQ-specific CG (which is referred to as "BFRQ CG") may be preconfigured by the gNB.

In some implementations, the gNB may (re)configure the AS layer of the UE through a DL RRC message that contains one or more MAC-CE-based BFR-related configurations. For example, the MAC-CE-based BFR-related configurations may include at least one of:

Configurations related to the BFRQ transmission control; and

Configurations related to the BFRQ CG.

In some implementations, the DL RRC message may include one or more specific IEs, such as BFR-related IEs (e.g., the BeamFailureRecoveryConfig IE), RLM-related IEs (e.g., the RadioLinkMonitoringConfig IE), and CG-specific IEs (e.g., the ConfiguredGrantConfig IE). The BFRQ transmission control configurations and the BFRQ CG configurations may be configured based on a per serving cell basis or a per DL/UL BWP basis.

In some implementations, with the DL RRC message from the gNB, the MAC entity of the UE may be configured with one or more of the following parameters for the BFRQ transmission control:

BFRQ_TransMax: Maximum number of BFRQ MAC CE transmissions on a PUSCH;

BFRQ_ProhibitTimer: Timer for prohibiting BFRQ MAC CE transmissions on a PUSCH; and BFRQ_Counter: Counter for counting the number of the transmitted BFRQ MAC CEs.

BFRQ_CG_ActivationTimer: Timer for activating a BFRQ CG (configuration).

In some implementations, the BFRQ_CG_ActivationTimer may be used to prevent the UE from transmitting the BFRQ MAC CE(s) on the BFRQ CG if the UE applies a dynamic grant (e.g., a PUSCH resource that is granted via a PDCCH) for the BFRQ MAC CE transmission.

In some implementations, when receiving the DL RRC message from the gNB, the MAC entity of the UE may be (optionally) configured with at least one of the following parameters for a BFRQ CG:

BFRQ_mcs-Table: Counter for counting the number of BFRQ MAC CE being transmitted;

nrofHARQ-Processes: Number of HARQ processes configured for the BFRQ CG;

repK: Number of repeat transmissions of a Transport Block (TB);

periodicity: Periodicity for UL transmission; and configuredGrantTimer: Initial value of the CG timer in multiples of the periodicity.

It should be noted that the BFRQ CG may be a new type of CG which is different from the type 1 CG or the type 2 CG.

In some implementations, since the BFRQ CG may be mainly provided for the BFRQ transmissions, the UL resource of the PUSCH configured by the BFRQ CG may only be needed by the UE after the MAC-CE-based BFR procedure is triggered and before the MAC-CE-based BFR procedure is failed, stopped or interrupted. In some implementations, a BFRQ CG may be implicitly activated by the UE when a MAC-CE-based BFR procedure is triggered, where the BFRQ CG configuration may be shared by multiple serving SCells that are configured with the MAC-CE-based BFR configuration. The gNB may configure the MAC-CE-based BFR configuration for a serving SCell by implicitly or explicitly indicating (e.g., through a specific IE, such as the BFRQ CG Cell IE, which may indicate the serving SCell index or the BFRQ CG index) to the serving SCell which serving SCell's BFRQ CG configuration should be applied. For example, the SCell #1 may be indicated by the gNB to apply the BFRQ CG of the SCell #2 for the BFRQ MAC CE transmission for the SCell #1. In other implementations, each serving SCell may be individually configured with a corresponding BFRQ CG configuration, which may or may not be configured on the same SCell/cell as the serving SCell. In addition, once the MAC-CE-based BFR is triggered for a serving SCell, the serving SCell that corresponds to the BFRQ MAC CE may apply the BFRQ CG configuration of the serving SCell for transmission.

In some implementations, a BFRQ CG may be explicitly activated by a UL grant indicated by DCI on the PDCCH, where the DCI may be scrambled by a Configured Scheduling-RNTI (CS-RNTI) of the UE. The gNB may configure multiple CS-RNTIs to the UE. Each CS-RNTI may be used to activate/deactivate a specific BFRQ CG, or activate/deactivate a specific BFRQ CG on a specific serving Cell.

In some implementations, the activation of a BFRQ CG may be implemented based on one or more of the following example options:

Option 1: A specific BFRQ CG may be implicitly activated by the UE after a specific MAC-CE-based BFR procedure is triggered;

Option 2: A specific BFRQ CG may be implicitly activated by the UE after a specific MAC-CE-based BFR procedure is triggered and one or more specific conditions are satisfied; and Option 3: A specific BFRQ CG may be implicitly activated by the UE when the value of the BFRQ_Counter reaches to a preconfigured threshold.

In some implementations, the specific BFRQ CG may be implemented based on one or more of the following example options:

Option 1: A BFRQ CG configured on a current active UL BWP;

Option 2: A BFRQ CG configured on the First-Active UL BWP;

Option 3: A BFRQ CG configured on an initial UL BWP;

Option 4: A BFRQ CG explicitly indicated by the gNB; and

Option 5: A BFRQ CG configured on a PCell, a Primary SCell (PSCell), or a specific cell.

It should be noted that the UL BWP configured with the BFRQ CG may be activated when the BFRQ CG is activated. In addition, in some implementations, the BFRQ CG may be replaced by a non-BFRQ specific CG that is not dedicatedly configured for the BFRQ MAC CE transmission.

As described above, a specific BFRQ CG may be implicitly activated by the UE after a specific MAC-CE-based BFR procedure is triggered and one or more specific conditions are satisfied (e.g., Option 2 of the activation of a BFRQ CG). In some implementations, the specific condition(s) may be implemented based on one or more of the following example conditions:

There is another ongoing RA procedure within same MAC entity;

There is an ongoing RA triggered on the PCell/Special (SpCell);

Current active UL BWP (of which the serving SCell triggers the MAC-CE-based BFR procedure) is configured with a BFRQ CG configuration;

Current active UL BWP (of which the serving SCell indicated by the BFRQ_CG_Cell of the serving SCell triggers the MAC-CE-based BFR procedure) is configured with BFRQ CG configuration;

There is no type 1 CG configured on the current active UL BWP, a specific serving cell (e.g., a PCell or a PSCell), the serving cell that triggers the MAC-CE-based BFR procedure, or the CG containing the serving cell that triggers the MAC-CE-based BFR procedure;

There is no type 2 CG configured and activated on the current active UL BWP, a specific serving cell (e.g., a PCell or a PSCell), a serving cell that triggers the MAC-CE-based BFR procedure, or the CG containing the serving cell that triggers the MAC-CE-based BFR procedure;

There is a pending Scheduling Request (SR) procedure;

There is a regular BSR (e.g., which is defined in the 3GPP Technical Specification (TS) 38.321) triggered and not cancelled;

A BFRQ_ProhibitTimer corresponding to the MAC-CE-based BFR procedure is not running;

A BFRQ_CG_ActivationTimer expires;

A BFRQ_CG_ActivationTimer is not running;

A BFRQ_CG_ActivationTimer is not configured;

A specific BFRQ_CG_ActivationTimer is not configured, not running or not configured;

The BFRQ_CG_ActivationTimer of the SCell is not running or not configured;

The BFRQ_CG_ActivationTimer of the SCell that triggers the MAC-CE-based BFR procedure is not running or not configured;

A BFRQ_ProhibitTimer is not running or not configured;

A specific BFRQ_ProhibitTimer is not running or not configured; and

A BFRQ_ProhibitTimer is not running or not configured, where the BFRQ_ProhibitTimer is configured for a serving SCell and the serving SCell has triggered the MAC-CE-based BFR procedure.

In some implementations, the BFRQ CG activation timer (BFRQ_CG_ActivationTimer) may be preconfigured by the gNB via a DL RRC message. The BFRQ_CG_ActivationTimer may start (or restart) from an initial value when the MAC-CE-based BFR procedure is triggered (e.g., if the BFRQ_CG_ActivationTimer is configured by the gNB). In some implementations, the BFRQ_CG_ActivationTimer may start (or restart) from an initial value when the MAC-CE-based BFR is triggered. In some implementations, the BFRQ_CG_ActivationTimer may restart from an initial value when the MAC-CE-based BFR procedure is triggered and a PUSCH resource is granted by the gNB.

In some implementations, the unit of the initial value of the BFRQ_CG_ActivationTimer may be symbol(s), slot(s), symbol/slot length(s), or the symbol/slot length of a BWP that is configured with the BFRQ CG. In some implementations, the unit of the initial value of the BFRQ_CG_ActivationTimer may be symbol(s), slot(s), or the symbol/slot length of the current active UL/DL BWP, where the UL/DL BWP may be configured with the BFRQ CG. In some implementations, the unit of the initial value of the BFRQ_CG_ActivationTimer may be symbol(s), slot(s), symbol/slot length(s), or the symbol/slot length of the UL BWP configured with the BFRQ CG, where the UL BWP may be applied by, or activated for, the UE to perform the MAC-CE-based BFR procedure or the BFRQ transmission.

In some implementations, the time unit of the initial value of the BFRQ_CG_ActivationTimer may be an absolute time unit (e.g., millisecond (ms)).

In some implementations, the BFRQ_CG_ActivationTimer may stop or restart when one of following conditions is satisfied:

A UL resource on a PUSCH is dynamically granted by the gNB;

A BFRQ MAC CE is contained in a MAC PDU during the multiplexing and assembly procedure;

A BFRQ MAC CE is contained in a MAC PDU during the multiplexing and assembly procedure and the MAC PDU is transmitted or completely transmitted.

In some implementations, a BFRQ CG may be implicitly deactivated by the UE when the MAC-CE-based BFR procedure is successfully performed or completed. In some implementations, the BFRQ CG may be deactivated when one or more of the following conditions are satisfied:

The MAC-CE-based BFR procedure stops;

The MAC-CE-based BFR procedure is successfully performed;

The MAC-CE-based BFR procedure is failed;

The value of the BFRQ_Counter reaches a preconfigured threshold value;

The value of the BFRQ_Counter reaches a threshold value, such as the value of BFRQ_TransMax; and The corresponding SCell is deactivated.

In some implementations, when a BFRQ CG is activated, the UL resource of the PUSCH of the BFRQ CG may recur periodically. If the PUSCH duration of the BFRQ CG overlaps a dynamic grant in the time domain and/or the frequency domain, the UE may drop/ignore/deprioritize the dynamic grant and apply the BFRQ CG for the BFRQ MAC CE transmission. On the other hand, if the PUSCH duration of the BFRQ CG overlaps a non-BFRQ specific CG in the time domain and/or the frequency domain, the UE may drop/ignore/deprioritize the non-BFRQ specific CG and apply the BFRQ CG for the BFRQ MAC CE transmission. In some implementations, the PUSCH duration of the BFRQ CG may be either the time duration for the corresponding HARQ initial transmission, or all of the time durations for the corresponding HARQ transmission (e.g., including both the initial transmission and the corresponding TB repetition).

In some implementations, each of the configured logical channels may be configured with a BFRQ-specific LCP restriction (e.g., the BFRQ_CG_Allowed IE) by a LogicalChannelConfig IE that is defined in the 3GPP TS 38.331. In some implementations, only the logical channel configured with the BFRQ_CG_Allowed IE may be selected as a candidate logical channel for the resource allocation procedure. In such cases, the MAC entity may only allocate the PUSCH resource of the BFRQ CG to the candidate logical channels. That is, the UL MAC Service Data Units (SDUs) from the candidate logical channel(s) may be transmitted on the BFRQ CG. In other implementations, only the logical channel that is configured with the BFRQ_CG_Allowed IE having a value of "true" may be selected as the candidate logical channel for the resource allocation procedure.

In some implementations, when the BFRQ CG is activated, all PUSCH resources of the CG type 1 and the CG type 2 (i.e., the non-BFRQ specific CG) may be released and deactivated. In addition, all CG timers corresponding to the PUSCH transmissions (except for the PUSCH transmission on the BFRQ CG) may stop.

In some implementations, the HARQ process ID for the BFRQ MAC CE transmission on the BFRQ CG may be determined by the MAC entity of the UE based on certain predefined/preconfigured rules. For example, the rules may be based on at least one of:

(1) the symbol index of a PUSCH resource of the BFRQ CG;

(2) the periodicity of the BFRQ CG; and (3) the number of HARQ processes configured by the gNB for the BFRQ CG.

In some implementations, a dedicated HARQ process ID may be reserved or configured for the BFRQ CG of a serving SCell. In this manner, even if a specific HARQ process ID is currently arranged or occupied by some PUSCH transmissions, the HARQ process may be interrupted or stopped by the PUSCH transmission on the BFRQ CG. That is, once the MAC-CE-based BFR procedure is triggered, the HARQ process (or HARQ process ID) determined by the MAC entity for the BFRQ MAC CE transmission may always be used (or be prioritized to be used), even if the same HARQ process is occupied (e.g., the HARQ process corresponding to the configuredGrantTimer IE, which is defined in the 3GPP TS 38.321, is running) by other UL data transmissions on other dynamic/configured grant.

In some implementations, a Physical Downlink Control Channel (PDCCH) may be transmitted by the gNB to the UE, and the UE may receive the PDCCH from the gNB. Similarly, a Physical Downlink Shared Channel (PDSCH) may be transmitted by the gNB to the UE, and the UE may receive the PDSCH from the gNB. For UL transmissions, a PUSCH/PUCCH may be transmitted by the UE to the gNB, and the PUSCH/PUCCH may be received by the gNB.

In some implementations, a PDSCH/PUSCH transmission may span multiple symbols in the time domain, where the time duration of a PDSCH/PUSCH (transmission) may be a time interval that starts from the beginning of the first symbol of the PDSCH/PUSCH (transmission) and end at the end of the last symbol of the PDSCH/PUSCH (transmission).

In some implementations, for a UE operating in the RRC_CONNECTED state and not configured with CA/Dual Connectivity (DC), the UE may be configured with only one serving cell (e.g., the primary cell). For a UE operating in the RRC_CONNECTED state and configured with CA/DC, the UE may be configured with multiple serving cells including an SpCell and one or more SCells.

In addition, in case of CA, two or more Component Carriers (CCs) may be aggregated. A UE may simultaneously receive or transmit signals on one or more of the CCs depending on its capabilities. CA may be supported with both the contiguous and non-contiguous CCs. When CA is applied, the frame timing and the System Frame Number (SFN) may be aligned across cells that are aggregated. In some implementations, the maximum number of configured CCs for a UE may be 16 for DL and 16 for UL. When CA is configured, the UE may have only one RRC connection with the network. During the RRC connection establishment/re-establishment/handover, one serving cell may provide the Non-Access Stratum (NAS) mobility information, and at RRC connection re-establishment/handover, one serving cell may provide the security input, where the serving cell may be referred to as the PCell. Depending on UE capabilities, SCells may be configured to form together with the PCell as a set of serving cells for the UE. The configured set of serving cells for a UE therefore always consists of one PCell and one or more SCells.

In some implementations, for the CG Type 1, the RRC entity may directly provide the configured uplink grant (including the periodicity). For the CG Type 2, the RRC entity may define the periodicity of the PUSCH resources of the CG, while the PDCCH addressed to the CS-RNTI may either signal and activate the configured uplink grant or deactivate it. That is, the PDCCH addressed to the CS-RNTI may indicate that the configured uplink grant can be reused according to the periodicity defined by the RRC entity, until the configured unlink grant is deactivated.

In some implementations, when a configured uplink grant is active, a UL transmission according to the configured uplink grant may be performed if the UE cannot find its C-RNTI/CS-RNTI on the PDCCH(s). If the UE receives its C-RNTI/CS-RNTI on the PDCCH(s), the PDCCH allocation may override the configured uplink grant.

In some implementations, a HARQ process may be used to ensure the transmissions between two or more peer entities at Layer 1 (e.g., PHY layer). A single HARQ process may support a TB when the PHY layer is not configured for the DL/UL spatial multiplexing. When the PHY layer is configured for the DL/UL spatial multiplexing, a single HARQ process may support one or multiple TBs. Each serving cell may correspond to a HARQ entity, where each HARQ entity may support a parallel processing of the DL and UL HARQ processes.

In some implementations, a HARQ-ACK may include a 1-bit indicator, where the HARQ-ACK may be a Negative Acknowledgement (NACK) when the bit value of the indicator is "0" and may be a positive Acknowledgement (ACK) when the bit value of the indicator is "1".

In some implementations, a BWP may be a subset of the total cell bandwidth of a cell. By configuring one or more BWPs to the UE and informing the UE that which of the configured BWPs is the currently the active BWP, Bandwidth Adaptation (BA) may be achieved. To enable the BA mechanism on the PCell, the gNB may configure the UE with one or more UL and DL BWPs. In case of CA, to enable the BA mechanism on SCells, the gNB may configure the UE with one or more DL BWPs at least (which means that there may be no UL BWPs configure to the UE). For the PCell, the initial BWP may be the BWP used for initial access. For the SCell(s), the initial BWP may be the BWP configured for the UE to first operate during the SCell activation process. In some implementations, the UE may be configured with a First-Active UL BWP by a firstActiveUplinkBWP IE field. If the First-Active UL BWP is configured for an SpCell, the firstActiveUplinkBWP IE field may contain the ID of the UL BWP to be activated when the RRC (re)configuration is performed. If the field is absent, the RRC (re)configuration may not trigger a BWP switch. If the First-Active uplink BWP is configured for an SCell, the firstActiveUplinkBWP IE field may contain the ID of the UL BWP to be used upon the MAC-activation of an SCell.

In some implementations, the gNB may dynamically allocate resources to the UE via a C-RNTI on one or more PDCCHs. The UE may always monitor the PDCCH(s) in order to find possible assignments when its DL reception is enabled (e.g., activity governed by DRX when configured). In some implementations, when CA is configured, the same C-RNTI may be applied to all serving cells. In some implementations, the PDCCH may be used to schedule the DL transmissions on a PDSCH and the UL transmissions on a PUSCH.

In some implementations, the (preferred) RS ID described above may be replaced by any other ID(s) which is used for explicitly or implicitly indicating a new beam to the gNB.

In some implementations, the DL RRC message may be an RRC reconfiguration message (e.g., including the RRCReconfiguration IE), an RRC resume message (e.g., including the RRCResume IE), an RRC reestablishment message (e.g., including the RRCReestablishment IE), an RRC setup message (e.g., including the RRCSetup IE), or any other DL unicast RRC message.

In some implementations, a beam may be considered as a spatial domain filter. For example, a wireless device (e.g., a UE) may apply the spatial filter in an analog domain by adjusting the phase and/or amplitude of a signal before transmitting the signal through a corresponding antenna element. In another example, the spatial filter may be applied in a digital domain by Multi-Input Multi-Output (MIMO) techniques in the wireless communication system. For example, a UE may perform a PUSCH transmission by using a specific beam which is a specific spatial/digital domain filter. In some implementations, a beam may be represented by (or corresponding to) an antenna, an antenna port, an antenna element, a group of antennas, a group of antenna ports, or a group of antenna elements. In some implementations, a beam may be formed by (or associated with) a specific RS resource. The beam may be equivalent to a spatial domain filter through which the Electromagnetic (EM) waves are radiated.

In some implementations, the transmitted signaling means that the MAC CE/MAC PDU/layer 1 signaling/higher layer signaling that contains (or corresponds to) the signaling is starting to be transmitted, completely transmitted, or has already delivered to the corresponding HARQ process/buffer for transmission. In some implementations, the transmitted signaling means that the corresponding HARQ_ACK feedback of a specific MAC PDU is received, where the specific MAC PUD may include the MAC CE/layer 1 signaling/higher layer signaling that contains (or corresponds to) the signaling. In some implementations, the transmitted signaling means that the MAC CE/MAC PDU corresponding to the signaling is built or generated.

In some implementations, when a MAC-CE-based BFR procedure is configured for an SCell, it means that the BFR function for the SCell is configured and/or enabled. In some implementations, when the BFR function for the SCell is configured, it means that the base station (e.g., a gNB) has configured one or more MAC-CE-based BFR configurations for the SCell. In some implementations, when the BFR function for the SCell is enabled, it means that the base station (e.g., a gNB) has configured one or more MAC-CE-based BFR configurations for the SCell, with some implicit or explicit mechanisms being provided to activate or deactivate the BFR function of the UE/MAC entity/serving cell.

In some implementations, a cell (e.g., a PCell or an SCell) may be a radio network object that may be uniquely identified by a UE through the corresponding identification information, which may be broadcast by a UTRAN access point in a geographical area. A cell may be operated in a Frequency Division Duplex (FDD) or a Time Division Duplex (TDD) mode.

In some implementations, the MAC entity of the UE may setup one or more timers for individual purposes, such as triggering uplink signaling retransmissions or limiting uplink signaling retransmission periods. When a timer (e.g., the timers described in various implementations of the present application) maintained by the MAC entity starts, the timer may start running until it stops or expires. In addition, the timer may not run when it does not start. A timer may start when it is not running. Also, a timer may restart when it is running. In some implementations, a timer may always start or restart from an initial value, where the initial value can be, but is not limited to, configured by the gNB via downlink RRC signaling. In addition, a time period defined by a timer may not be updated except that the timer stops or expires (e.g. due to a BWP switch).

Figure 8:
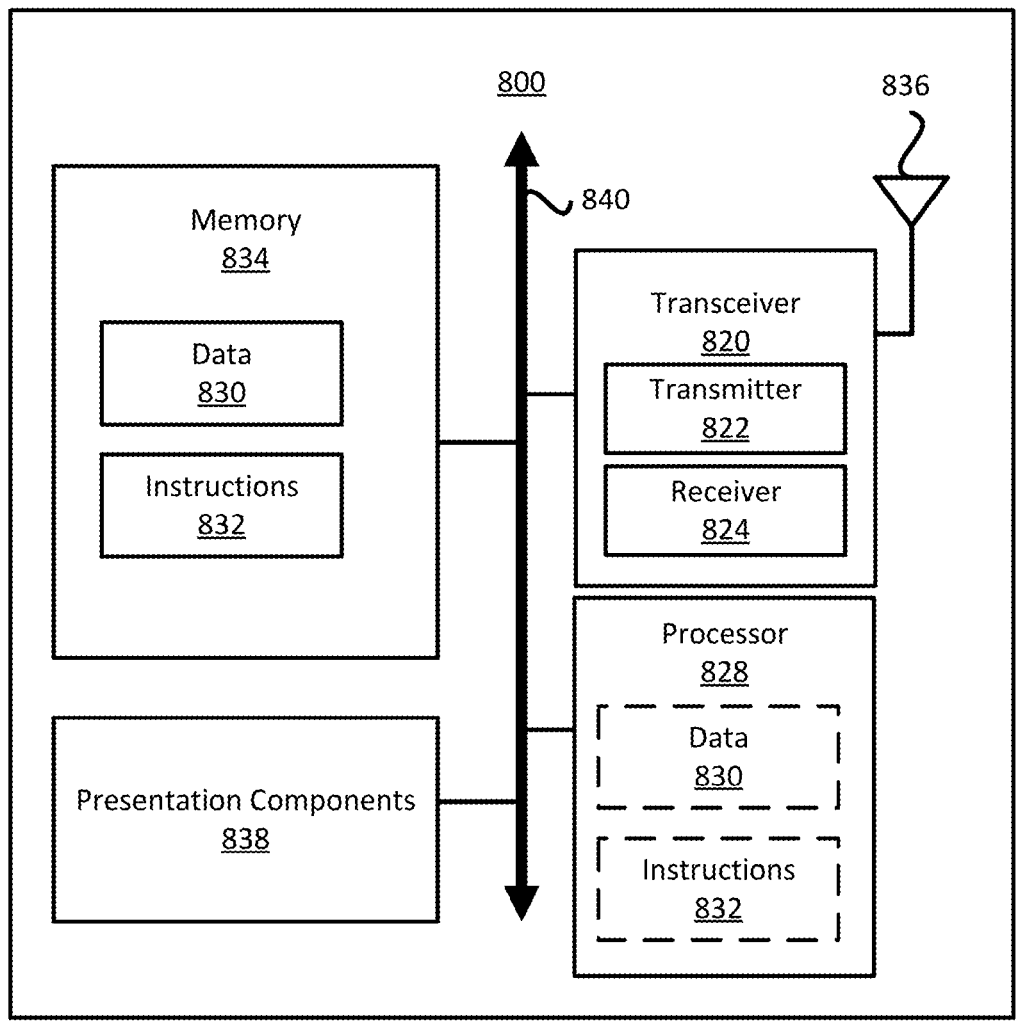
FIG. 8 is a block diagram illustrating a node for wireless communication, in accordance with various aspects of the present application.

FIG. 8 is a block diagram illustrating a node for wireless communication, in accordance with various aspects of the present application. As shown in FIG. 8, a node 800 may include a transceiver 820, a processor 828, a memory 834, one or more presentation components 838, and at least one antenna 836. The node 800 may also include an RF spectrum band module, a BS communications module, a network communications module, and a system communications management module, Input/Output (I/O) ports, I/O components, and power supply (not explicitly shown in FIG. 8). Each of these components may be in communication with each other, directly or indirectly, over one or more buses 840. In one implementation, the node 800 may be a UE or a BS that performs various functions described herein, for example, with reference to FIGS. 1 through 7.

The transceiver 820 having a transmitter 822 (e.g., transmitting/transmission circuitry) and a receiver 824 (e.g., receiving/reception circuitry) may be configured to transmit and/or receive time and/or frequency resource partitioning information. In some implementations, the transceiver 820 may be configured to transmit in different types of subframes and slots including, but are not limited to, usable, non-usable and flexibly usable subframes and slot formats. The transceiver 820 may be configured to receive data and control channels.

The node 800 may include a variety of computer-readable media. Computer-readable media may be any available media that may be accessed by the node 800 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 834 may include computer-storage media in the form of volatile and/or non-volatile memory. The memory 834 may be removable, non-removable, or a combination thereof. Example memory includes solid-state memory, hard drives, optical-disc drives, and etc. As illustrated in FIG. 8, The memory 834 may store computer-readable, computer-executable instructions 832 (e.g., software codes) that are configured to, when executed, cause the processor 828 to perform various functions described herein, for example, with reference to FIGS. 1 through 7. Alternatively, the instructions 832 may not be directly executable by the processor 828 but be configured to cause the node 800 (e.g., when compiled and executed) to perform various functions described herein.

The processor 828 (e.g., having processing circuitry) may include an intelligent hardware device, e.g., a Central Processing Unit (CPU), a microcontroller, an ASIC, and etc. The processor 828 may include memory. The processor 828 may process the data 830 and the instructions 832 received from the memory 834, and information through the transceiver 820, the base band communications module, and/or the network communications module. The processor 828 may also process information to be sent to the transceiver 820 for transmission through the antenna 836, to the network communications module for transmission to a core network.

One or more presentation components 838 presents data indications to a person or other device. Examples of presentation components 838 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A User Equipment (UE) comprising:
   one or more non-transitory computer-readable media having computer-executable instructions embodied thereon; and
   at least one processor coupled to the one or more non-transitory computer-readable media, and configured to execute the computer-executable instructions to:
   perform at least one Beam Failure Recovery (BFR) procedure including:
   transmitting a Medium Access Control (MAC) Control Element (CE) for BFR to a base station, wherein the MAC CE for BFR includes:
   a cell information field indicating information of a serving cell in which the BFR procedure is triggered; and
   a presence indicator field indicating whether an identity of a preferred Reference Signal (RS) for BFR is included in the MAC CE for BFR, the preferred RS being associated with the serving cell.

2. The UE of claim 1, wherein when the presence indicator field is set to a specific value, the MAC CE for BFR further includes an RS identity field indicating the identity of the preferred RS for BFR.

3. The UE of claim 2, wherein the at least one processor is further configured to execute the computer-executable instructions to:
   receive a downlink Radio Resource Control (RRC) message including a beam failure recovery configuration Information Element (IE) from the base station, wherein the identity of the preferred RS for BFR is configured by the beam failure recovery configuration IE.

4. The UE of claim 1, wherein the MAC CE for BFR is identified by a header of a MAC sub-Protocol Data Unit (sub-PDU) with a dedicated Logical Channel Identity (LCID).

5. The UE of claim 1, wherein the at least one processor is further configured to execute the computer-executable instructions to:
   prioritize transmitting the MAC CE for BFR over transmitting data from any logical channel that is not an Uplink Common Control Channel (UL-CCCH) in a logical channel prioritization procedure.

6. A method performed by a User Equipment (UE), the method comprising:
   performing at least one Beam Failure Recovery (BFR) procedure including:
   transmitting a Medium Access Control (MAC) Control Element (CE) for BFR to a base station, wherein the MAC CE for BFR includes:
   a cell information field indicating information of a serving cell in which the BFR procedure is triggered; and
   a presence indicator field indicating whether an identity of a preferred Reference Signal (RS) for BFR is included in the MAC CE for BFR, the preferred RS being associated with the serving cell.

7. The method of claim 6, wherein when the presence indicator field is set to a specific value, the MAC CE for BFR further includes an RS identity field indicating the identity of the preferred RS for BFR.

8. The method of claim 7, further comprising:
   receiving a downlink Radio Resource Control (RRC) message including a beam failure recovery configuration Information Element (IE) from the base station, wherein the identity of the preferred RS for BFR is configured by the beam failure recovery configuration IE.

9. The method of claim 6, wherein the MAC CE for BFR is identified by a header of a MAC sub-Protocol Data Unit (sub-PDU) with a Logical Channel Identity (LCID).

10. The method of claim 6, further comprising:
    prioritize transmitting the MAC CE for BFR over transmitting data from any logical channel which is not an Uplink Common Control Channel (UL-CCCH) in a logical channel prioritization procedure.

* * * * *